United States Patent Office 3,719,375
Patented Mar. 6, 1973

3,719,375
REINFORCED PIPE JOINT
Karl Olof Nordin, Varnamo, Sweden, assignor to Forsheda Gummifabric AB, Forsheda, Sweden
Filed Mar. 1, 1971, Ser. No. 120,036
Claims priority, application Sweden, Mar. 2, 1970, 2,678/70
Int. Cl. F16l 21/06
U.S. Cl. 285—339                 5 Claims

ABSTRACT OF THE DISCLOSURE

An arrangement for imparting stability and rigidity to a pipe joint including a pair of pipes havng their adjacent ends placed in concentric relationship and with an annular space therebetween. A seal ring is located in the space for precluding escape of fluid carried in the pipes. To impart stiffness to the joint, a pair of tapered inner and outer rings are placed in interlocking engagement in the space and are arranged to be axially displaceable in a tightening direction. As the inner ring is forced inwardly along the pipe, both rings are compressed and locked together by coacting teeth thus imparting stiffness to the joint and precluding axial displacement of the rings outwardly.

BACKGROUND OF THE INVENTION

The invention described herein relates to pipe joints and particularly to joints of the type utilizing supporting rings for imparting stiffness to the joint interconnecting adjacent ends of a pair of pipes.

The prior art discloses many different types of couplings and coupling arrangements for interconnecting the ends of two pipes used in diverse kinds of piping systems. Although such couplings usually are effective, the need often exists for pipe joints of a type wherein separate seals and exterior support elements are necessary for imparting stability and rigidity to the pipe joint.

In the past, a packing of textile fibres was employed to form the seal between adjacent pipe ends and the required rigidity was obtained by lead caulking. Excellent results also have been achieved by utilizing rubber packing means for sealing purposes.

The stiffening effect on the other hand has been more difficult to achieve in any other way, and as a result, caulking with lead remains the preferred practice. Many solutions have been suggested and tried, but with comparatively poor success. The most common method adopted has been to employ a single supporting ring of plastic material or metal. In the majority of cases, a plastic and/or metal ring will provide the joint with sufficient rigidity, providing uniformity exists in the dimensional tolerances of all pipes used, and from this point of view, the method is quite satisfactory. The difficulties and problems however arise from a different source.

Manufacturers of cast iron pipe are permitted substantial leeway in certain dimensional deviations, and the permitted production tolerances are comparatively generous. For example, in some instances, the clearance between socket and spigot ends of a pipe having an internal diameter of 100 millimeters is allowed to vary between 6 and 8.5 mm., i.e., between 6% and 8.5%. Such a large differential in size is difficult and sometimes impossible to compensate for when a single supporting ring is used for stiffening purposes. Since the rings are designed to accommodate average deviations in pipe size, when the pipe diameter is at or less than the minimum tolerance permitted, any application of even average forces applied to the joint results in fracture of the pipe ends. Likewise, pipe diameters of maximum tolerance, or greater, results in poor quality stiffness and the pipe joint then is ineffective. Well known reversible rings and rings of corrugated sheet metal or plastic material also suffer the same disadvantages.

SUMMARY OF THE INVENTION

Briefly stated, in accordance with one aspect of the invention, the above disadvantages are eliminated by making the supporting rings in the pipe joint of two interacting rings, one outer and one inner ring, bearing against each other along tapered surfaces, and being axially displaceable relative to each other, thus causing the radial thickness of the supporting ring to vary between a maximum and a minimum limit. The rings are capable of easy displacement axially in relation to each other in one direction but frictional or physical projections on the tapered surfaces preclude their displacement in the opposite or outward direction.

BRIEF DESCRIPTION OF THE DRAWING

While the specification concludes with claims particularly pointing out and distinctly claiming the subject matter o fthe invention, it is believed the invention will be better understood from the following description taken in connection with the accompanying drawings wherein:

DESCRIPTION OF THE PREFERRED EMBODIMENT

Figure 1:
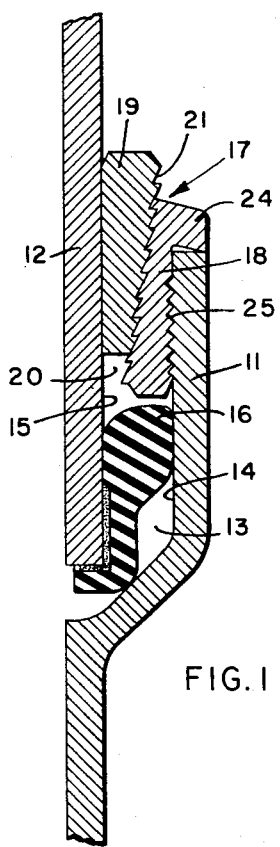
FIG. 1 is a cross sectional view in elevation of a pipe joint including rings for sealing and providing stiffness to the joint.

Referring now to the drawing wherein like reference characters designate like or corresponding parts throughout the several views, there is shown a socket-end 11 of a cast-iron pipe and a spigot-end 12 of an adjacent pipe in a piping system. The annular clearance 13 between the internal cylindrical surface 14 of the socket 11, and the cylindrical outer surface 15 of the spigot-end 12, is arranged to accommodate not only a rubber or similar seal ring 16, between the socket-end and the spigot-end, but also a supporting ring 17. The rubber ring may either be of the slide ring type shown in FIG. 1, or a conventional roller ring, or a combination of both. The rubber ring performs a sealing function and does not materially contribute to rigidity against bending in the joint. Obviously, other conventional seal rings may be used.

As shown, the supporting ring comprises two separate but interacting rings 18 and 19, preferably of plastic material. The rings are arranged to be concentrically disposed around the outside surface of pipe end 12 and substantially within the socket end 11. In order to provide a firm interlocking relationship between the two rings after installation, their facing surfaces 20 and 21 which bear against each other, are tapered and equipped with a multiplicity of coacting ridges 22 and 23, FIG. 2, which are of uniform size, and in cross section, have the shape of a hook or barb These complementary ridges perform the locking function.

Figure 2:
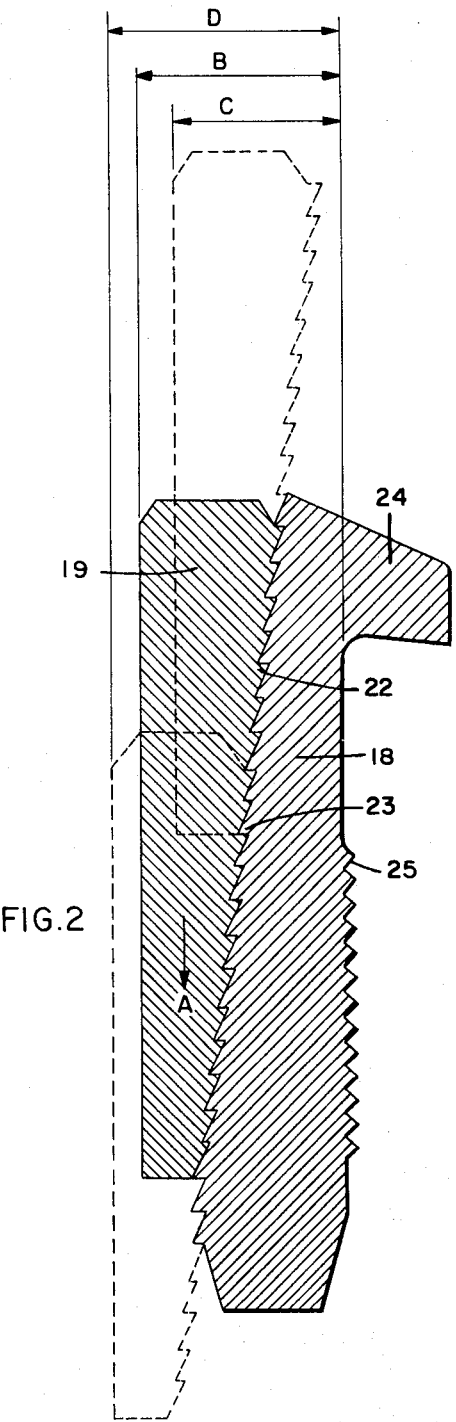
FIG. 2 is an enlarged view of a section of the pipe joint shown in FIG. 1.

The disposition of the tapered surfaces and ridges are such that as ring 19 is forced into the joint, downwardly in FIGS. 1 and 2, the ridges 22 and 23 will deform slightly because of the resiliency of plastic material, and permit a limited amount of displacement in relation to each other in the direction of arrow A. Since the ridges or hooks are in interlocking engagement, movement axially in the opposite direction out of the joint is effectively precluded.

It has been found that there is a certain tendency on the part of the supporting ring (rings 18 and 19) to be "rolled" out of the joint under circumstances when it is exposed to a simultaneous bending and rolling action. For the purpose of preventing such an occurrence, the ring 18 is provided with external grooves and annular elevations 25 which bite into and frictionally engage the inside surface of the socket end 11 of the pipe. Obviously, other kinds of frictional means may be resorted to for limiting the movement of the ring and pipe contacting surfaces relative to each other.

In addition to the locking arrangement described above, the ring 18 is equipped with an outwardly projecting flange 24 adapted to extend over the outermost end of the pipe. The flange serves to limit movement of ring 18 into the joint while still presenting an area along the ring axial length to be compressed when ring 19 is forced into position. The flange also serves to permit removal of both rings from the joint when desired by inserting a tool between the flange and the end of the pipe.

In many cases there is no necessity for imparting any special rigidity to a pipe joint, such as, for example, when lengths of piping are deposited in sand or are being cast into joists and the like. In other cases, however, when a plant or a portion of a plant is prefabricated at some distance from the building site and subsequently has to be conveyed thereto, it is essential that satisfactory stability and stiffness of the joint be maintained and the structure described above effectively performs that function.

In assembling the pipe joint, the rubber seal ring 16 is positioned over the spigot end 12 of a pipe, and the rings 18 and 19 which together form the supporting ring 17, are likewise applied to the spigot-end of the pipe. They are preferably split open at least in one place, with the result that the rings can be bent out and forced over the pipe-end subsequent to the rubber ring having been placed in position. As the inside ring 19 is then pressed inwardly, the outer ring 18 which bears against the socket end 11 will be squeezed outwardly as the ridges 22 and 23 successively engage each other. When ring 19 is moved to its most inward position, ring 18 will be deformed in the manner illustrated in FIG. 1, thus imparting a high degree of stability and rigidity to the pipe joint.

The relative positions of the rings 18 and 19 at maximum and minimum clearance between the socket and spigot-ends are indicated by dotted lines in FIG. 2. B represents normal clearance, C lowest possible, and D, maximum permissible clearance.

It will be apparent thatt he above-described structure, in addition to providing stiffness to a pipe joint, also permits use of the same size rings in a piping system wherein the pipes vary radically in diameter. The substantial degree of flexibility provided by the use of rings of the above design, not only accomodates pipes of different size diameter but also eliminates the possibilities of fracturing the pipe walls from excessive application of force, and alternatively, of having ineffective pipe joints because of the inability of the rings to impart the desired degree of stiffness to the joint components.

In view of the above, it will be apparent that many modifications and variations are possible in light of the above teachings. It therefore is to be understood that within the scope of the appended claims, the invention may be practised other than as specifically described.

What I claim as new and desire to secure by U.S. Letters Patent is:

1. A pipe joint for interconnecting adjacent ends of a pair of pipes comprising a first pipe having a spigot portion and a second pipe having a bell portion concentrically disposed and positioned around said spigot portion and defining a space therebetween, a rubber ring sealing the space between said pipe portions in the axially outer area of the spigot portion of said first pipe and the adjacent axially inner area of the bell portion of said second pipe, stiffening means comprising a pair of concentrically disposed rings interposed between and engaging said pipes, the first of said rings having an axial inner surface engaging the outer surface of the spigot portion of said first pipe in the axial region of the mouth of said bell portion and having an outer surface tapering inwardly in the direction of the said axially outer area of the spigot portion, the second of said rings having an outwardly projecting flange at the axially outer end engaging the free end surface of said bell portion, an axial outer surface engaging the inner surface of said bell portion of said second pipe in regions of the mouth of said bell portion and an inner surface tapering inwardly in the direction of the axially inner area of said bell portion and engaging the said tapered outer surface of said first ring so that when the first ring is forced axially into said second ring in the direction of said axially outer area of said spigot portion, the second ring is caused to deform radially outwardly while said first ring deforms radially inwardly to thereby impart stiffening characteristics to said joint, said rings projecting into said space while leaving an axial distance between said rings and said rubber ring, cooperating elements of locking means on siad tapered surfaces arranged to permit relative axial displacement of said rings toward joint stiffening position but preventing relative axial displacement of said rings in the opposite direction.

2. A pipe joint according to claim 1 wherein each of said concentrically disposed ring are axially split to facilitate the assembly of said joint.

3. A pipe joint according to claim 1 wherein said locking means comprises a multiplicity of annular ridges distributed along the length of the tapered surfaces of said rings so that when the first ring is urged axially into engagement with the first pipe and the second ring, the ridges on the first ring slide over the ridges on the second ring and interlock therewith, thus preventing displacement of said rings axially outward from said space.

4. A pipe joint according to claim 1 in which said second ring comprises external serrations which engage the inside of said bell portion upon radially outward deformation of said second ring to inhibit displacement of said second ring in the axially outward direction in said bell portion.

5. A pipe joint according to claim 1 in which said rings are formed of a material which is at least slightly resilient.

References Cited

UNITED STATES PATENTS

| 2,996,317 | 8/1961 | Kibbie et al. | 285—421 |
| 611,159 | 9/1898 | Webb | 285—374 X |
| 3,038,194 | 6/1962 | Arenson | 287— 114 X |
| 3,193,299 | 7/1965 | Gardner et al. | 285—339 X |
| 1,884,064 | 10/1932 | McWane | 285—374 X |
| 1,646,660 | 10/1927 | Prince | 287—114 X |
| 3,198,561 | 8/1965 | Witt | 285—421 X |

FOREIGN PATENTS

| 1,255,369 | 1/1961 | France | 287—114 |
| 73,685 | 4/1944 | Czechoslovakia | 285—296 |
| 488,943 | 7/1938 | Great Britain | 285—296 |
| 1,043,730 | 11/1958 | Germany | 285—296 |

THOMAS F. CALLAGHAN, Primary Examiner

U.S. Cl. X.R.

285—374